United States Patent
Thames et al.

(10) Patent No.: US 6,790,271 B2
(45) Date of Patent: Sep. 14, 2004

(54) SOY PROTEIN BASED ADHESIVE CONTAINING A VEGETABLE OIL DERIVATIVE

(75) Inventors: Shelby F. Thames, Hattiesburg, MS (US); Richard C. Cook, Evansville, IN (US); Sharathkumar K. Mendon, Hattiesburg, MS (US)

(73) Assignee: The University of Southern Mississippi, Hattiesburg, MS (US)

( * ) Notice: Subject to any disclaimer, the term of this patent is extended or adjusted under 35 U.S.C. 154(b) by 0 days.

(21) Appl. No.: 10/193,697

(22) Filed: Jul. 11, 2002

(65) Prior Publication Data

US 2004/0007156 A1 Jan. 15, 2004

(51) Int. Cl.$^7$ ............... C08L 89/00; C08L 91/00; C09D 189/00; C09J 189/00
(52) U.S. Cl. ............... 106/148.1; 106/148.52
(58) Field of Search ............... 106/148.1, 148.52, 106/137.1

(56) References Cited

U.S. PATENT DOCUMENTS

| | | | | |
|---|---|---|---|---|
| 5,523,293 A | * | 6/1996 | Jane et al. | 514/21 |
| 5,607,633 A | | 3/1997 | Sleeter et al. | 264/115 |
| 5,665,152 A | * | 9/1997 | Bassi et al. | 106/145.1 |
| 5,710,190 A | | 1/1998 | Jane et al. | 521/102 |
| 5,942,058 A | | 8/1999 | Sleeter et al. | 156/62.2 |
| 5,942,174 A | | 8/1999 | Thole et al. | 264/83 |
| 6,083,623 A | | 7/2000 | Stofko | 428/403 |
| 6,132,885 A | | 10/2000 | Peek et al. | 428/485 |

* cited by examiner

*Primary Examiner*—Helene Klemanski
(74) *Attorney, Agent, or Firm*—Howrey Simon Arnold & White, LLP

(57) ABSTRACT

A soy protein based adhesive useful in particleboards and other composites is formed from a mixture of soy protein isolate, a polyol plasticizer and a vegetable oil derivative. The preferred plasticizer is glycerol and the preferred vegetable oil derivative is the maleinized methyl ester of tung oil.

13 Claims, No Drawings

SOY PROTEIN BASED ADHESIVE CONTAINING A VEGETABLE OIL DERIVATIVE

BACKGROUND

The present invention is directed to soy protein based adhesives useful in the manufacture of particleboard and other composites. More particularly, the present invention is directed to a water resistant soy protein based adhesive containing a vegetable oil derivative.

Soy protein was used as an adhesive ingredient in plywood in the early 1900s. However, the problem of low moisture resistance led to its replacement with petroleum-based resins in the 1930s. Particleboard composites were subsequently developed that utilized urea-formaldehyde resins to bind the wood particles rather than agricultural adhesives.

However, increasing environmental awareness and the recognized hazards of formaldehyde-based adhesives has created a strong demand for more environmentally friendly wood adhesives. Successful replacement of urea formaldehyde resins in particleboard requires an adhesive that can produce composites having characteristics matching or exceeding those attainable with urea formaldehyde. Accordingly, water resistance is a necessary characteristic of any suitable replacement.

Soybean proteins are a combination of 18 amino acids of wide chemical diversity such as amines, carboxylic acids, hydroxyls and mercaptan functionalities. Each of these functionalities is polar and contributes to water sensitivity. Accordingly, in order to use soy protein as an effective adhesive, it is necessary to counteract this sensitivity. Additionally, the soybean binder must be chemically transformed into a hydrophobic adhesive without creating toxic by-products and/or waste streams.

In view of the foregoing, it would be a significant advancement in the art to provide an agriculturally based adhesive which could be utilized to replace urea formaldehyde resins in particleboard and other composites. It would be a further advancement in the art if such an adhesive was primarily based upon renewable resources. Such an adhesive is disclosed and claimed herein.

SUMMARY OF THE INVENTION

The present invention is directed to a soy protein based adhesive useful in the formation of particleboard and other composites. The adhesive contains a vegetable oil derivative to impart water resistance. In a preferred embodiment, the adhesive comprises a mixture of soy protein isolate, a polyol plasticizer, and a vegetable oil derivative. The preferred vegetable oil derivatives are maleinized vegetable oils.

DESCRIPTION OF PREFERRED EMBODIMENTS

The present invention is directed to a novel binder suitable for use in making particleboard and other composite materials. In a preferred embodiment, the binder of the present invention comprises a mixture of soy protein such as soy protein isolate, a plasticizer, and a vegetable oil derivative. The plasticizer is preferably a polyol such as glycerol. The vegetable oil derivative preferably is a fatty acid or oil which has been modified to include an anhydride pendent group.

Soy proteins must be combined with other ingredients in order to form suitable adhesive compositions. Soybean proteins are inherently unable to flow at elevated temperatures and pressures because of inter- and intra-molecular hydrogen bonds. Accordingly, the hydrogen bonding of the proteins must be disrupted with plasticizers for improved molecular mobility and a reduction in the pressure that is required to initiate flow. Polyhydric alcohols are known to be excellent plasticizers for soy protein.

Many different types of polyols can be used in the present invention. Suitable examples are 1,6-hexanediol, 2,5-hexanediol, 2-methyl-2-hexanol, 1,4-butanediol, 2,3-butanediol, 1,3-propanediol, 1,2-propanediol, 1,2,3-propanetriol (glycerol), 2-ethyl-2-(hydroxymethyl)-1,3-propanediol (trimethylol propane), and 1,2-ethanediol. Glycerol is a particularly preferred plasticizer for the present invention since it is non-toxic and is a renewable resource readily obtainable from vegetable oils.

When low concentrations of glycerol, i.e., 10–30 weight percent, are blended with soy protein isolate, they produce a homogeneous powder with only slightly higher particle cohesion than soy protein isolate alone. The particles are easily separated under low shear conditions which is an important factor for an adhesive to be blended with wood furnish to form particleboard.

When plasticizers are added to soy protein isolate, they improve flow but reduce $T_g$. Accordingly, it is desirable to add compounds which can counteract the polyol effects and generate an adhesive less flexible after it has been cured. It is important for a particleboard binder to possess some flexibility. However, excessive flexibility produces creeping under load. Many different compounds can be used to increase adhesive stiffness such as lignin and its derivatives, and conventional fillers such as ground walnut shells, calcium carbonate, and silicates. Of these, lignin is preferred since it is the polymeric material responsible for the stiffness of trees and vegetation, and is non-toxic and a renewable resource. A particularly preferred form of lignin for use in the present invention are lignosulfonates.

In order to use soy protein as a suitable adhesive in applications such as particleboard, it is necessary to improve the water resistance of the adhesive composition. Vegetable oil derivatives, when suitably modified, make ideal precursors from which to synthesize water-resistant additives. Vegetable oils are ideal precursors because they are nontoxic, biodegradable, renewable, nonvolatile at temperatures required to cure with composites, and are able to undergo chemical modification via double bonds located on the fatty acid residues.

Vegetable oils are comprised of one glycerol molecule bonded to three fatty acids via ester linkages. The most common fatty acids in vegetable oils are oleic, linoleic, linolenic and eleostearic. It has been found that by chemically altering the oils to introduce sites that react with protein nucleophiles and polyol plasticizers, water resistant adhesive formulations can be formed.

Many different compositions can be used to form vegetable oil derivatives. These include organic acids, acylhalides, anhydrides, aldehydes, ketones and epoxides. The preferred components for modifying the vegetable oils are the anhydrides. Cyclic, dehydrated di-acids were found to be advantageous for several reasons. First, they possess increased reactivity over organic acids and epoxides. Second, the ring-opening reaction does not produce unwanted by-products. Third, they produce bonds which are more stable than those formed by aldehydes and ketones. Finally, anhydrides can be attached to vegetable oils via Diels-Alder reactions through a binary reaction without solvents and waste streams.

In a preferred embodiment, vegetable oils containing eleostearic acid are utilized since the conjugated double bonds easily react with maleic anhydride. Tung oil is a preferred vegetable oil for use in the present invention because of the high concentration of eleostearic acid. The methyl ester of tung oil is even more preferred since it has a lower viscosity than tung oil after being maleinized. Additionally, a modified linseed oil known as Archer 1 available from Archer Daniels is also particularly suitable for use in the present invention.

In a preferred embodiment, the vegetable oil derivative is synthesized by heating the methyl ester of tung oil to 80° C., adding excess maleic anhydride while stirring and allowing the components to react for 6–8 hours, removing unreacted maleic anhydride via sublimation, and determining anhydride equivalent weights by assaying the vegetable oil derivatives with standardized methanolic alkali. Such a procedure produces a maleinized methyl ester of tung oil having an anhydride equivalent weight of about 410 g/mol. A similar procedure can be used to maleinize Archer 1 and produce a product having an anhydride equivalent weight of about 890 g/mol.

Any vegetable oil derivative that contains anhydride functionality will work in the present invention.

The adhesive compositions of the present invention can be formulated by existing techniques. For example, a ceramic ball mill can be used to mix the ingredients. Additionally, a mortar and pestle can be used to mix small amounts. In a preferred embodiment the binder composition of the present invention comprises 50–80% by weight soy protein, 20–30% by weight plasticizer and 10–20% by weight vegetable oil derivative. The composition can also include lignin. In a particularly preferred embodiment, the binder composition comprises about 60% by weight soy protein, about 20% by weight plasticizer, about 15% by weight vegetable oil derivative and about 5% by weight lignin.

The invention is illustrated by the following examples which describe preferred embodiments of the present invention. However, it should be appreciated that the examples are illustrative only and are not limiting as to the scope of the invention.

EXAMPLE 1

Adhesives which can be used to make the particleboards or other composites were prepared as follows:

The vegetable oil derivative used in the adhesive was the maleinized methyl ester of tung oil (MMETO) and was synthesized by heating the methyl ester of tung oil to 80° C., adding excess maleic anhydride while stirring and allowing the components to react for 6–8 hours. Unreacted maleic anhydride was then removed via sublimation and the anhydride equivalent weight was determined by assaying the product with standarized methanolic alkali. A maleinized methyl ester of tung oil having an anhydride equivalent weight of about 410 g/mol was produced.

The adhesives utilized in the following examples were prepared by blending the ingredients in a sealed, ceramic ball mill jar using 1-inch alumina mixing stones. The liquid components were first added to the ball mill jar which was sealed and placed on rollers. After mixing, the jar was removed from the rollers and inspected to insure that the liquids uniformly coated the stones and jar walls. The dry ingredients were then mixed together and added to the jar. The jar was resealed, placed on the rollers and the speed was adjusted until the stones began to cascade. Blending was stopped periodically and the ingredients scraped from the inside walls of the jar until the texture changed from a non-homogeneous mixture to a uniform cohesive blend. The mixing stones were removed from the adhesive by pouring the ball mill contents onto a wire screen with ½ inch openings.

Two adhesive formulations were prepared. The first adhesive formulation comprised 65% soy protein isolate, 30% glycerol and 5% lignosulfonate. The second adhesive composition contained 60% soy protein isolate, 20% glycerol, 15% maleinized methyl ester of tung oil and 5% lignosulfonate.

Each of the adhesive mixtures formed a dry adhesive powder that was stable at room temperature for about 5 days.

EXAMPLES 2–4

A plurality of particleboards were prepared using the adhesives of Example 1 and were tested using three different formulations. The particleboards were produced using two aluminum cauls, i.e., top and bottom, and a 17-inch by 9-inch forming box that was 10 inches deep. The samples were made with small wood furnish particles, i.e., less than 3 mm in length, at the surfaces and wood furnish greater than 10 mm in the core. The particleboard mats were designed to be ½-inch thick after cure and had a face/core/face material weight ratio of 27:46:27 and a 50 lb/ft$^3$ target density. Due to material loss around the edges of the mat during compression, the mats produced boards that were 15 inches long and 6 inches wide after the edges were removed.

Adhesive concentrations ranged from 7 to 10 wt % and were blended with face and core wood furnish separately in a high-speed Henschel blender. Wood furnish and adhesive were added to the blender and allowed to mix at 1,000 rpm for one minute. Particleboard mats were formed by hand using the forming box and aluminum cauls. Mat production began by placing the forming box on a caul and adding optional water to the surface as a mist. Next, one-half the facial adhesive/wood furnish blend was added to the box, followed by the core, and finally the remaining facial material. After each adhesive/wood furnish blend addition, the material was smoothed by hand and once all material was added, a temporary wood insert was used to compress the mat while removing the forming box. The final step consisted of misting water onto the mat surface, adding the second caul, and placing the mat into the heated press. Mats were cured at 165° C. while increasing the pressure to 500 psi and holding for 30 seconds, then reducing the pressure to 350 psi and holding for the remainder of the curing cycle, which was 270 seconds. Once cured, pressure was slowly reduced and the board was removed from the press, separated from the cauls, and placed on its side to cool. The size constraint of the press platens produced either two 3-inch× 15-inch samples for testing modulus of rupture (MOR) and modulus of elasticity (MOE) or multiple 2×2-inch samples, for testing internal bond strengths (IB), face pull (FP), thickness swelling (TS) and water absorption (WA). However values were also obtained for MOR, MOE, IB, and FP from a single board cutting the 2-inch specimens from the MOR/MOE test panels. All mats were cooled for at least 24 hours prior to testing.

The compositions of the samples were as follows:

TABLE 1

| Example | Adhesive Formulation (wt. %) | Adhesive Concentration (wt. %) |
|---|---|---|
| 2 | 65% soy protein isolate<br>30% glycerol<br>5% lignosulfonate | 10% in Face<br>7% in Core |
| 3 | 60% soy protein isolate<br>20% glycerol<br>15% maleinized methyl ester of tung oil<br>5% lignosulfonate | 10% in Face<br>7% in Core |
| 4 | 60% soy protein isolate<br>20% glycerol<br>15% maleinized methyl ester of tung oil<br>5% lignosulfonate | 10% in Face<br>10% in Core |

The effects of MMETO and its concentration on composite strength and water resistance were determined via IB, TS, and WA. FIGS. 1–3 compare the IB strengths versus density for the composites. All boards had a similar density range, e.g., 52 to 60 lbs/ft$^3$ and the composites containing 7 wt % adhesive in the core and no MMETO exhibited IB values between 50 and 80 psi with an average IB of 68±11 psi. (See FIG. 1.) Composites produced with 7 wt % adhesive in the core containing 15 wt % MMETO showed similar IB results as the boards without MMETO and had an average IB equal to 74±12 psi. (See FIG. 2.) However, upon addition of 10 wt % of the MMETO-based adhesive to the core, the average IB value rose to 88±16 psi with a maximum value of 117 psi. (See FIG. 3.) The increased IB values are more clearly seen in FIG. 4 and are the result of improved strength via increased wood furnish coverage by higher binder concentrations. Although the average IB valued increased with increasing adhesive concentration, the coefficient for both adhesive levels was greater than 15% and the result of adhesive spot-welds.

Water submersion results for these composites showed that the boards without MMETO were stable in water for less than 24 hours and the average 2-hour water absorption and thickness swelling values were 58±7% and 43±9%, respectively. On the other hand, composites containing MMETO in the adhesive showed dramatic improvement in the 2-hour water resistance. The 7 wt % MMETO adhesive reduced the 2-hour WA and TS to 18±7% and 16±8%, respectively. Submersion tests for composites with 10 wt % MMETO adhesive yielded 2-hour WA and TS of 12±6% and 8±6%.

While the invention has been described with respect to the presently preferred embodiments, it will be appreciated that changes and modifications can be made without departing from the spirit of the invention. Accordingly, the scope of the invention is to be determined by the following claims.

What is claimed is:

1. A binder composition comprising:

soy protein;

a plasticizer; and a vegetable oil derivative which has been altered to introduce at least one site suitable for reacting with protein nucleophiles and polyol plasticizers.

2. A binder composition as defined in claim 1 wherein the plasticizer comprises a polyol.

3. A binder composition as defined in claim 2 wherein the polyol comprises glycerol.

4. A binder composition as defined in claim 1 wherein the vegetable oil derivative comprises a maleinized vegetable oil.

5. A binder composition as defined in claim 4 wherein the maleinized vegetable oil comprises maleinized methyl ester of tung oil.

6. A binder composition as defined in claim 1 further comprising lignin.

7. A binder composition as defined in claim 1 wherein said soy protein comprises 50–80% by weight of said binder, said plasticizer comprises 20–30% by weight of said binder, and said vegetable oil derivative comprises 10–20% by weight of said binder.

8. A binder composition as defined in claim 7 further comprising lignin.

9. A binder composition as defined in claim 8 wherein the lignin is lignosulfonate.

10. A binder composition comprising:

about 60% by weight soy protein;

about 20% by weight plasticizer;

about 15% by weight vegetable oil derivative which has been altered to introduce at least one site suitable for reacting with protein nucleophiles and polyol plasticizers; and about 5% by weight lignin.

11. A binder composition as defined in claim 10 wherein the plasticizer comprises glycerol.

12. A binder composition as defined in claim 10 wherein the vegetable oil derivative comprises a maleinized vegetable oil.

13. A binder composition as defined in claim 10 wherein the lignin is lignosulfonate.

* * * * *